United States Patent
Noh et al.

(10) Patent No.: US 8,162,501 B2
(45) Date of Patent: Apr. 24, 2012

(54) DISPLAY DEVICE HAVING HIGH BRIGHTNESS UNIFORMITY AT POSITIONS CLOSE TO LIGHT SOURCE

(75) Inventors: Jae Heon Noh, Hwaseong-si (KR); Jong Il Kim, Anyang-si (KR); Dong Seob Jang, Seoul (KR); Seong Ho Youn, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 312 days.

(21) Appl. No.: 12/320,996

(22) Filed: Feb. 10, 2009

(65) Prior Publication Data

US 2009/0268432 A1  Oct. 29, 2009

(30) Foreign Application Priority Data

Apr. 28, 2008  (KR) .................. 10-2008-0039532

(51) Int. Cl.
*G02F 1/13357* (2006.01)
*F21V 5/00* (2006.01)
(52) U.S. Cl. .............. 362/97.3; 362/333; 362/619
(58) Field of Classification Search .......... 362/617, 362/619, 621, 625, 626, 97.1, 333, 97.2, 362/97.3; 359/599; 349/64
See application file for complete search history.

(56) References Cited

U.S. PATENT DOCUMENTS

| 5,552,907 | A * | 9/1996 | Yokota et al. ............... 349/62 |
| 6,576,887 | B2 * | 6/2003 | Whitney et al. ........ 250/227.11 |
| 7,160,003 | B2 * | 1/2007 | Saitoh et al. ................ 362/330 |
| 7,703,973 | B2 * | 4/2010 | Zhu et al. ..................... 362/623 |
| 7,789,548 | B2 * | 9/2010 | Chao et al. .................. 362/619 |
| 7,806,545 | B2 * | 10/2010 | Hsu et al. ................... 362/97.2 |
| 2005/0243551 | A1 | 11/2005 | Onishi et al. |
| 2008/0068716 | A1 | 3/2008 | Goto |

FOREIGN PATENT DOCUMENTS

| JP | 2005-3753 | 1/2005 |
| WO | 2006/135202 | 12/2006 |

OTHER PUBLICATIONS

European Search Report dated Jun. 22, 2010 issued in European Patent Application 09157206.5.

* cited by examiner

*Primary Examiner* — Peggy A. Neils
(74) *Attorney, Agent, or Firm* — Staas & Halsey LLP

(57) ABSTRACT

A display device including a plurality of light sources spaced apart from one another, a refracting plate disposed over the plurality of light sources, and first and second refracting surfaces formed at both surfaces of the refracting plate to allow light emitted from the light sources to be scattered plural times by passing through the refracting plate, the first and second refracting surfaces having different shapes from each other. With the display device, light emitted from the light sources can be uniformly diffused, whereby high brightness uniformity can be accomplished even at positions relatively close to the light source, resulting in a reduction in a thickness of the display device.

21 Claims, 7 Drawing Sheets

(a)

(b)

(a)

(b)

DISPLAY DEVICE HAVING HIGH BRIGHTNESS UNIFORMITY AT POSITIONS CLOSE TO LIGHT SOURCE

CROSS-REFERENCE TO RELATED APPLICATIONS

This application claims the priority benefit of Korean Patent Application No. 2008-0039532, filed on Apr. 28, 2008 in the Korean Intellectual Property Office, the disclosure of which is incorporated herein by reference.

BACKGROUND

1. Field

The present invention relates to a display device, and, more particularly, to a display device wherein light emitted from a light source is uniformly diffused, whereby high brightness uniformity can be accomplished even at positions relatively close to the light source, resulting in a reduction in a thickness of the display device.

2. Description of the Related Art

Generally, widely-used display devices can be classified into light-emitting display devices and light-receiving display devices. Light-emitting display devices are self-illuminating, and include, for example, a Cathode Ray Tube (CRT) and Plasma Display Panel (PDP). Light-receiving display devices have no self-illuminating function, and a representative example thereof is a Liquid Crystal Display (LCD).

Such a light-receiving display device has no self-illuminating function, and thus, requires a light source to irradiate light to a display panel provided in the display device to display an image on the display panel.

Light sources are classified, according to an installation position thereof, into direct-light type light sources and edge-light type light sources. A direct-light type light source is provided at the rear side of a display panel to directly irradiate light toward the display panel. An edge-light type light source is provided at a side of a light guide panel such that light emitted from the light source is refracted and diffused along the light guide panel so as to be irradiated toward a display panel. Such an edge-light type light source, in which the light source is provided only at a side of the display panel, may suffer from deterioration of brightness uniformity at the center of the display panel when the display panel has a large size. Therefore, large-scale display devices generally adopt the direct-light type light source.

Even when adopting the direct-light type light source, high brightness uniformity is essential to improve the performance of a display device. Brightness is measured as luminous intensity per apparent unit area. Brightness uniformity is a numerical value representing how uniform brightness-distribution of an entire display panel is when light emitted from a light source is irradiated to the display panel. Brightness uniformity is represented by a value between 0% and 100% with higher values representing more uniform distribution of brightness.

Brightness uniformity is closely related with thickness of a display device. Hereinafter, characteristics of a display device according to a conventional display device will be described, on the basis of a relationship between brightness uniformity and a thickness of the display device, with reference to FIG. 1.

Light sources L1 and L2 are arranged with a predetermined interval therebetween. Although the conventional display device adopts a plurality of cylindrical light sources parallel to one another, for convenience of explanation, only the first light source L1 and the second light source L2 are illustrated. The first light source L1 and the second light source L2 emit respective light beams.

First and second brightness curves R1 and R2 represent brightness of light beams, which are irradiated from the first and second light sources L1 and L2 to a display panel P, respectively. As can be intuitively recognized from the first brightness curve R1 having a convex center C, brightness of a light beam emitted from the first light source L1 is highest at the center C as an upper end of the first brightness curve R1, and decreases gradually away from the center C. It can be understood from the second brightness curve R2, showing a similar pattern to the first brightness curve R1, that the above-described characteristic is similarly observed in the case of the second light source L2.

The first and second brightness curves R1 and R2 of light beams emitted from the first and second light sources L1 and L2 have an overlapping region, and mixing of the light beams occurs at the overlapping region. The mixing of light beams has characteristics of "additive color mixture". The term "additive color mixture" denotes that light beams overlap each other, yielding a brighter color than their original colors. This phenomenon occurs because the intensity of visually recognizable light beams increases as the light beams are mixed. With the additive color mixture, brightness increases at the overlapping region of the first and second brightness curves R1 and R2. As a result, brightness-distribution represented by a combined brightness curve R3 is obtained.

It can be understood from the combined brightness curve R3 that a constant brightness area F, which has brightness similar to the highest brightness of the center C, occurs between the first light source L1 and the second light source L2. As described above, if several light sources are arranged with an appropriate interval in addition to the first and second light sources L1 and L2, the constant brightness area F is continuously extended, whereby the several light sources have the effect of a single surface light source. Accordingly, when a display panel P is located at a position distant from the ground surface B by a first distance D1, the entire display panel P can achieve uniform brightness.

However, due to the fact that the display panel P should be located in the constant brightness area F, the conventional display device requires an interior space distant from the ground surface B by at least the first distance D1, and consequently, is problematically thick.

The above-described problem is further clearly recognized from the fact that a display panel P exhibits uneven brightness when it is distant from the ground surface B by a shorter second distance D2 in order to reduce a thickness thereof.

SUMMARY

Accordingly, it is an aspect of the invention to provide a display device wherein light emitted from a light source is uniformly diffused, whereby high brightness uniformity can be accomplished even at positions relatively close to the light source, resulting in a reduction in a thickness of the display device.

Additional aspects, features, and/or advantages of the invention will be set forth in part in the description which follows and, in part, will be obvious from the description, or may be learned by practice of the invention.

In accordance with an aspect of the invention, there is provided a display device including a plurality of light sources spaced apart from one another; a refracting plate disposed over the plurality of light sources; and first and second refracting surfaces formed at opposite surfaces of the refracting plate to allow light emitted from the light sources to be scattered plural times by passing through the refracting plate, the first and second refracting surfaces having different shapes from each other.

The first refracting surface may define a triangular waveform formed throughout the first refracting surface of the refracting plate, and vertexes of the triangular waveform may be oriented toward the light sources.

The vertexes have a vertex angle, which may be in a range of 76 to 80 degrees.

The second refracting surface may define a sinusoidal waveform formed throughout the second refracting surface of the refracting plate, the second refractive surface having alternately repeated valleys and ridges, and the second refractive surface having dents, which are dented toward the light sources, which may be formed at the ridges.

The dents may be located over the light sources, which may be spaced apart from one another.

The first and second refracting surfaces may be arranged such that the light emitted from the light sources first passes through the first refracting surface, and thereafter, passes through the second refracting surface.

The refracting plate may be provided by extrusion molding of transparent plastic resin.

The light sources may be Cold Cathode Fluorescent Lamps (CCFLs) or Light Emitting Diodes (LEDs).

In accordance with another aspect of the invention, there is provided a display device including a plurality of light sources spaced apart from one another; and a refracting plate arranged over the plurality of light sources and having one surface defining a triangular waveform and an opposite surface defining a sinusoidal waveform to allow light emitted from the light sources to be refracted and scattered plural times, the sinusoidal waveform being provided, at positions above the respective light sources, with dents to be dented toward the light sources.

In accordance with a further aspect of the invention, there is provided a display device including a plurality of light sources spaced apart from one another; a refracting plate arranged over the plurality of light sources and having refracting surfaces to allow light emitted from the light sources to be refracted and scattered plural times; and a display panel to display an image using the light having passed through the refracting plate.

The refracting surfaces may include a first refracting surface defining a triangular waveform formed throughout the first refracting surface of the refracting plate; and a second refracting surface, which is opposite the first refracting surface, the second refractive surface defining a sinusoidal waveform formed throughout the second refractive surface of the refracting plate and provided with dents, which are dented toward the light sources.

The dents may be repeatedly formed at ridges of the sinusoidal waveform, and are located above the light sources.

The first and second refracting surfaces may be provided at the refracting plate such that the light emitted from the light sources first passes through the first refracting surface, and thereafter, passes through the second refracting surface.

The display device may further include a diffusing plate interposed between the refracting plate and the display panel, to facilitate diffusion of the light having passed through the refracting plate.

The display device may further include a reflecting plate provided at a rear side of the light sources, to reflect the light emitted from the light sources toward the refracting plate.

The refracting plate may be provided by extrusion molding of transparent plastic resin.

The light sources may be Cold Cathode Fluorescent Lamps (CCFLs) or Light Emitting Diodes (LEDs).

In accordance with a still further aspect of the invention, there is provided a display device including a plurality of light sources spaced apart from one another; a refracting plate arranged over the plurality of light sources and having one surface defining a triangular waveform and an opposite surface defining a sinusoidal waveform to allow light emitted from the light sources to be refracted and scattered plural times, the sinusoidal waveform being provided, at positions above the respective light sources, with dents, which are dented toward the light sources; and a display panel to display an image using the light having passed through the refracting plate.

BRIEF DESCRIPTION OF THE DRAWINGS

These and/or other aspects, features, and advantages will become apparent and more readily appreciated from the following description of exemplary embodiments, taken in conjunction with the accompanying drawings, of which.

DETAILED DESCRIPTION OF EMBODIMENTS

Figure 1:
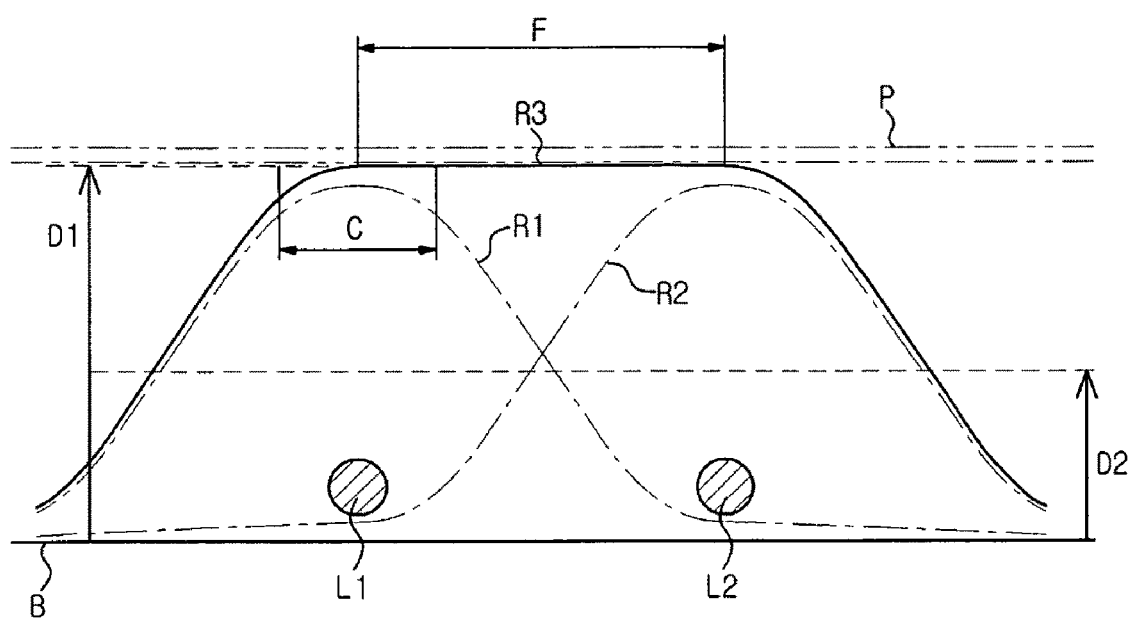
FIG. 1 is a view illustrating characteristics of a display device in accordance with a conventional display device.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

Figure 2:
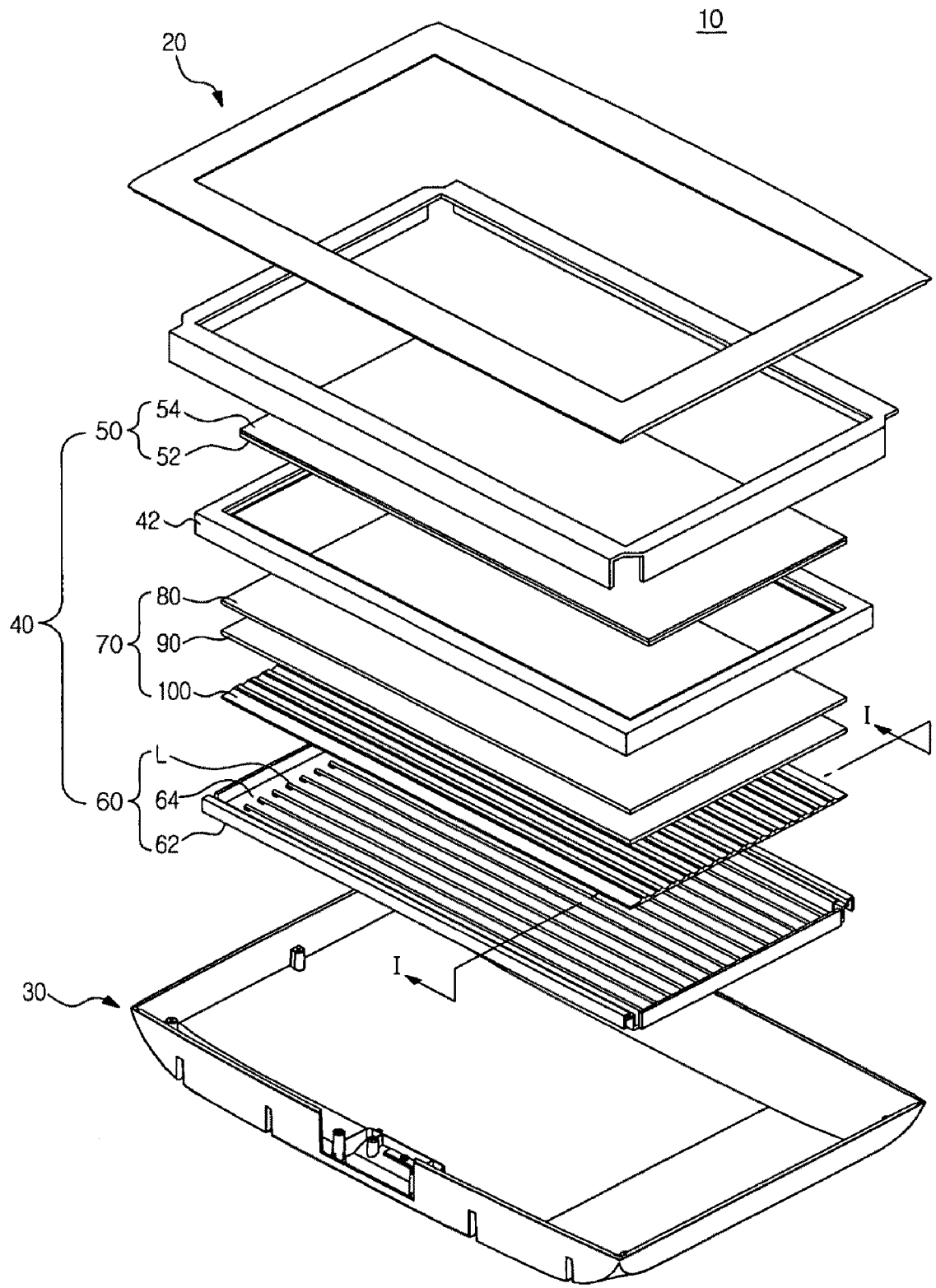
FIG. 2 is an exploded perspective view of a display device in accordance with an exemplary embodiment of the present invention.

FIG. 2 is an exploded perspective view of a display device in accordance with an exemplary embodiment of the present invention.

As shown, the display device 10 in accordance with an exemplary embodiment of the present invention includes front and rear covers 20 and 30, and a display module 40 including a variety of elements.

The front and rear covers 20 and 30 define an external appearance of the display device 10, and are provided with selected ornamentation to arouse the user's aesthetic appreciation. The front and rear covers 20 and 30 are coupled with each other and protect the display module 40 interposed therebetween.

The display module 40 includes a display panel 50 to display an image using liquid crystals, a backlight assembly 60 to irradiate light to the display panel 50, and an optical plate 70 to uniformly diffuse the light irradiated from the backlight assembly 60.

The display panel 50 includes a thin film transistor (TFT) substrate 52, a color filter substrate 54 disposed to correspond to the TFT substrate 52, and a liquid crystal layer (not shown) interposed between the TFT substrate 52 and the color filter substrate 54. The display panel 50 displays an image using characteristics of liquid crystals to be aligned according to an electric signal. Since the display panel 50 is a light-receiving type display panel having no self-illuminating function, to display an image to the outside, the backlight assembly 60 must be provided to irradiate light to the display panel 50.

The backlight assembly 60 includes a bottom chassis 62, a reflecting plate 64 located inside the bottom chassis 62, and light sources L arranged over the reflecting plate 64.

The bottom chassis 62 defines an overall appearance of the backlight assembly 60. The bottom chassis 62 is an integral element formed by plastic injection molding. The reflecting plate 64 is disposed inside the bottom chassis 62.

The reflecting plate 64 reflects light emitted downward from the light sources L toward the display panel 50, to improve efficiency of the light sources L. To facilitate reflection of light toward the display panel 50, the reflecting plate 64 has triangular raised portions arranged between the respective parallel light sources L (See FIG. 4).

The light sources L are arranged over the reflecting plate 64 inside the bottom chassis 62, and emit light to allow a user to recognize the image displayed on the light-receiving type display panel 50. In an exemplary embodiment, the light sources L are arranged parallel to one another with a predetermined interval. The light sources L may be Cold Cathode Fluorescent Lamps (CCFLs) or Light Emitting Diodes (LEDs). For example, plural longitudinally-elongated CCFLs, which are similar to common fluorescent lamps, may be arranged parallel to one another within the bottom chassis 62. Alternatively, plural LEDs may be longitudinally arranged to serve as a single CCLF, and similarly, the LEDs may be arranged throughout the bottom chassis 62 to irradiate light toward the display panel 50.

The optical plate 70 is interposed between the backlight assembly 60 and the display panel 50 and allows the light emitted from the light sources L to be uniformly irradiated throughout the display panel 50. The optical plate 70 is fixed to the bottom chassis 62 by a middle bezel 42. The optical plate 70 includes a condensing plate 80, a diffusing plate 90, and a refracting plate 100.

The condensing plate 80 is disposed underneath the display panel 50. The light, emitted from the light sources L of the backlight assembly 60, passes through the condensing plate 80, and an optical path thereof is altered so as to extend along a path perpendicular to the display panel 50. The diffusing plate 90 is disposed underneath the condensing plate 80.

The diffusing plate 90 diffuses the light emitted from the light sources L and reduces a brightness difference. The diffusing plate 90 is a translucent plate such as a frosted glass plate. With the provision of the diffusing plate 90, the light emitted from the light sources L can be diffused. However, the frosted glass type diffusing plate 90 provides insufficient diffusion, and has a limit to reduce a thickness of the display device 10 even if the display panel 50 is installed closer to the bottom chassis 62. For this reason, the refracting plate 100 is interposed between the diffusing plate 90 and the light sources L, to facilitate diffusion of light.

The refracting plate 100 has a shape and size similar to the condensing plate 80 or the diffusing plate 90. The refracting plate 100 allows the light emitted from the light sources L to be refracted and scattered by passing through first and second refracting surfaces 110 and 120 (FIG. 3) of the refracting plate 100. Specifically, the refracting plate 100 serves to scatter the light, having passed through the refracting plate 100, in opposite left and right directions of the light sources L at the upper side of the light sources L. Such a refracting plate 100 is made of transparent plastic resin, and is prepared via extrusion molding. Extrusion molding of the refracting plate 100 eliminates a problem of residual stress caused upon injection molding. Accordingly, the refracting plate 100 does not suffer from deformation even after extended periods of time, and can achieve a reduction in molding costs. Hereinafter, a detailed configuration of the refracting plate 100 will be described with reference to FIG. 3.

Figure 3:
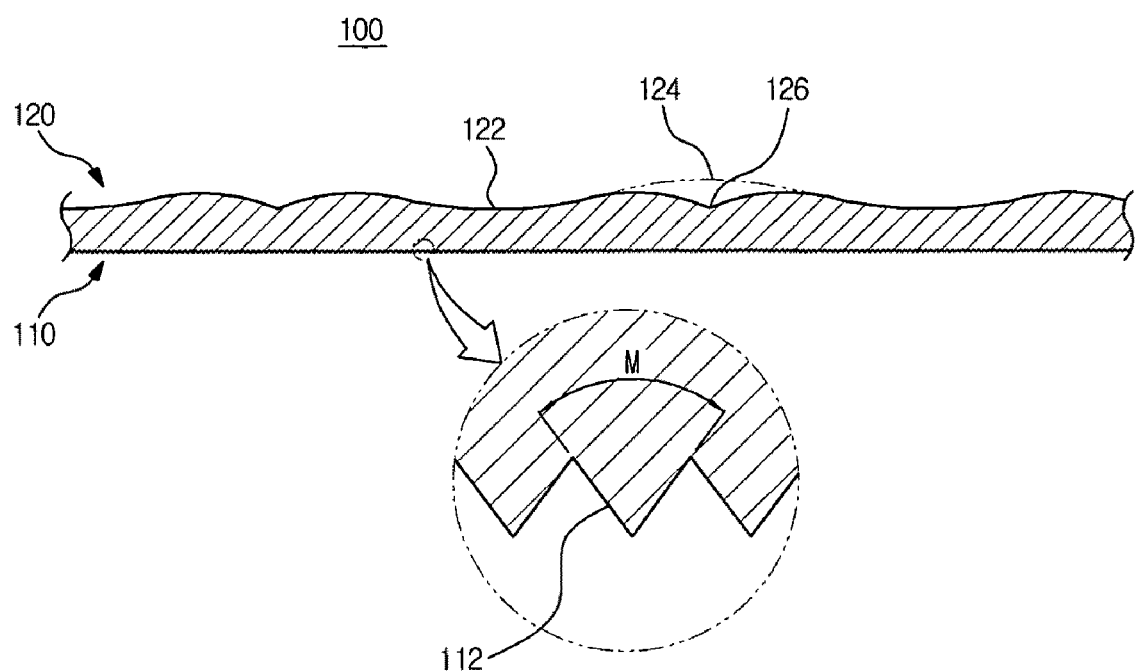
FIG. 3 is a sectional view taken along line I-I of a refracting plate of FIG. 2.

FIG. 3 is a sectional view taken along line I-I of the refracting plate of FIG. 2.

As shown, the refracting plate 100 in accordance with an exemplary embodiment of the present invention includes a first refracting surface 110 defining a triangular waveform 112, and a second refracting surface 120 defining a sinusoidal waveform provided with dents 126.

The first refracting surface 110 is a lower surface of both surfaces of the refracting plate 100 and is disposed opposite the light sources L (FIG. 2). The first refracting surface 110 is configured in such a way that the triangular waveform 112, having a pitch from several tens of microns to several hundred microns, is defined throughout the first refracting surface 110.

The triangular waveform 112 causes incident light to be refracted randomly, to achieve uniform brightness. Specifically, as described above, the triangular waveform 112 has a small pitch from several tens of microns to several hundred microns, and also, can refract and direct incident light in different directions as the incident light obliquely enters faces of the triangular waveform 112. Refracting and directing incident light in different directions prevents light from illuminating only specific spots close to the light sources L (FIG. 2), thereby improving brightness uniformity. Vertexes of the triangular waveform 112, oriented toward the light sources L (FIG. 2), have an angle M in a range of 76 to 80 degrees, and most preferably, of 78 degrees. A reason why the angle M of the vertexes of the triangular waveform 112 must be in a range of 78±2 degrees will be described hereinafter.

The second refracting surface 120 is an upper surface of both the surfaces of the refracting plate 100 opposite to the light sources L (FIG. 2). After the light emitted from the light sources L (FIG. 2) is primarily refracted and scattered by passing through the first refracting surface 110, the light is secondarily refracted and scattered by passing through the second refracting surface 120. That is, primarily and secondarily refracting the light through the first and second refracting surfaces 110 and 120 facilitates scattering of light. The second refracting surface 120 defines a sinusoidal waveform throughout the refracting plate 100. Although a general sinusoidal waveform provides valleys 122 and ridges 124 which are alternately repeated, the second refracting surface 120 adopts dents 126 instead of the ridges 124.

The dents 126 are provided as ridges of a sinusoidal waveform are dented toward the light sources L (FIG. 2). The dents 126 are provided above the respective light sources L (FIG. 2). Specifically, a distance between the neighboring dents 126 of the second refracting surface 120 is equal to a distance between the light sources L (FIG. 2).

Hereinafter, effects of the display device in accordance with an exemplary embodiment of the present invention having the above-described configuration will be described with reference to FIG. 4.

Figure 4:
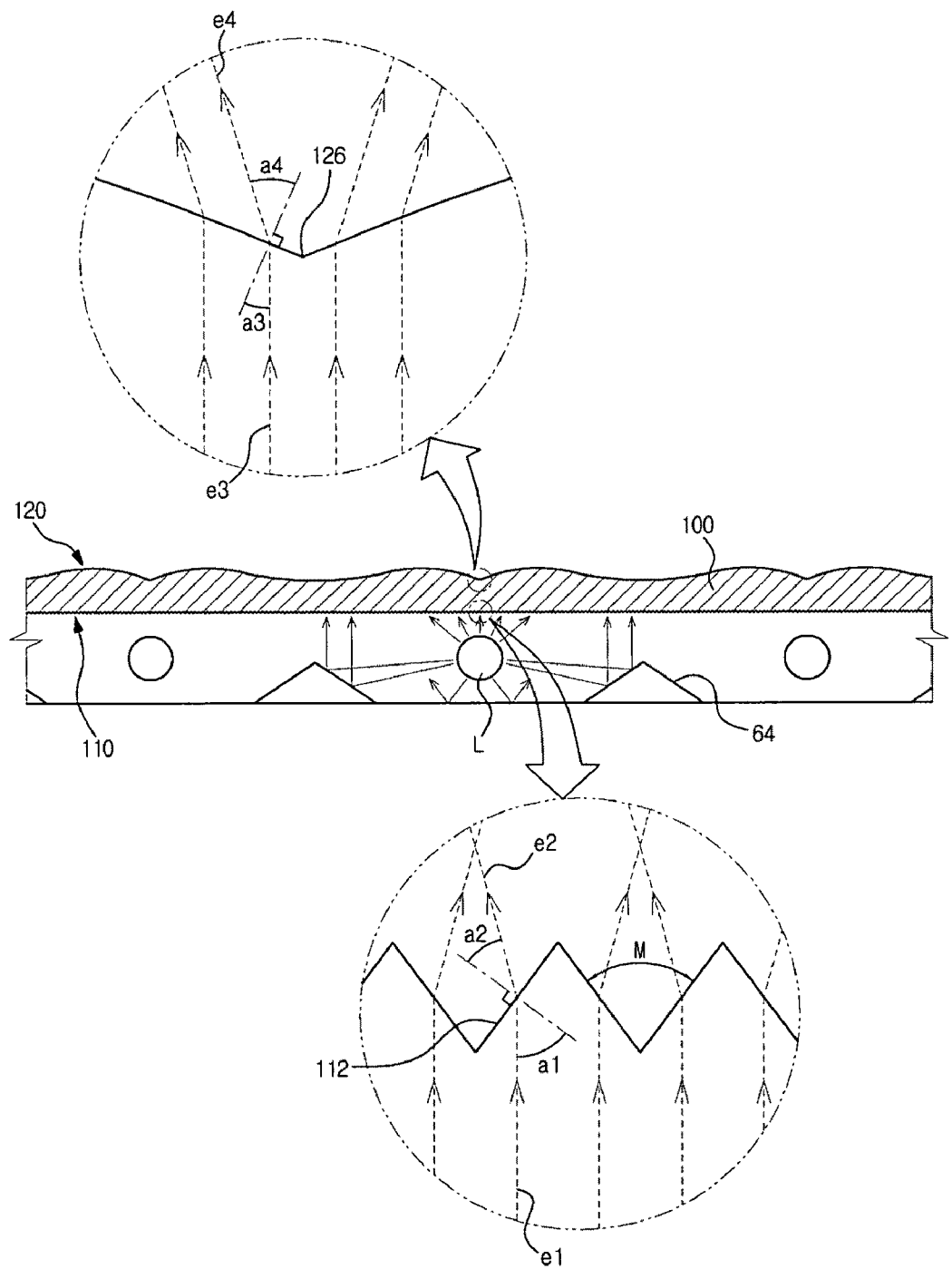
FIG. 4 is a view illustrating path of light with relation to the refracting plate of FIG. 2.

FIG. 4 is a view illustrating path of light with relation to the refracting plate of FIG. 2.

As shown, light is diverged in all directions about the light source L. Of diverged light beams, the light beams diverged downward or in left and right directions from the light source L are directed upward by the reflecting plate 64.

Such an upwardly directed light beam reaches the first refracting surface 110. Although the light beam passes through air prior to reaching the first refracting surface 110, the light beam refracted, based on Snell's law, when passing through the first refracting surface 110 as a boundary between the refracting plate 100 and air, thereby being changed in path.

Snell's law represents a relationship between an angle of incidence and an angle of refraction when light passes through an interface of different two media. As will be understood from Snell's law, an angle of incidence is smaller than an angle of refraction when light passes from a less dense medium to a more dense medium. The angle of incidence is an angle defined between an incident light beam and a normal line of an incidence plane, and the angle of refraction is an angle defined between an emerging light beam and a normal line of an incidence plane.

As can be clearly understood from Snell's low, when a first incident light beam e1 enters from air, as a less dense medium, to the refracting plate 100 as a more dense medium, an angle of refraction a2 between a first emerging light beam e2 and a normal line of an incidence face of the triangular waveform 112 is smaller than an angle of incidence a1 between the first incident light beam e1 and the normal line. That is, the angle of refraction a2 is smaller than the angle of incidence a1, and the first incident light beam e1 is directed in a different direction than an incident direction thereof.

The light beam, which is primarily refracted and scattered in the course of passing through the first refracting surface 110, reaches the second refracting surface 120.

With relation to the second refracting surface 120, when a second incident light beam e3 enters from the refracting plate 100, as a more dense medium, to the air as a less dense medium, the second refracting surface 120 exhibits light refraction opposite to that of the first refracting surface 110. That is, with relation to the second refracting surface 120, an angle of refraction a4 is larger than an angle of incidence a3. Accordingly, the second incident light beam e3 fans out from the dent 126, being scattered into a second emerging light beam e4.

Since the dent 126 is located above the light source L, the largest amount of light is incident near the dent 126. However, the large amount of light, incident near the dent 126, exhibits the same characteristics as the second emerging light beam e4 due to the shape of the dent 126, and consequently, fans out when emerging from the dent 126. This prevents a region above the light source L from having a higher brightness than the remaining region, and results in uniform distribution of brightness even at positions relatively close to the light source L.

With the uniform distribution of brightness at a distance close to the light source L, the display panel 50 (FIG. 2) can be positioned closer to the light source L than in the prior art, and consequently, the display device 10 (FIG. 2) can be designed thinner than in the prior art.

The vertexes of the triangular waveform 112, oriented to face the light sources L, have an angle M in a range of 76 to 80 degrees, and most preferably, of 78 degrees. Now, the angle M of the vertexes will be described with reference to FIG. 5.

Figure 5:
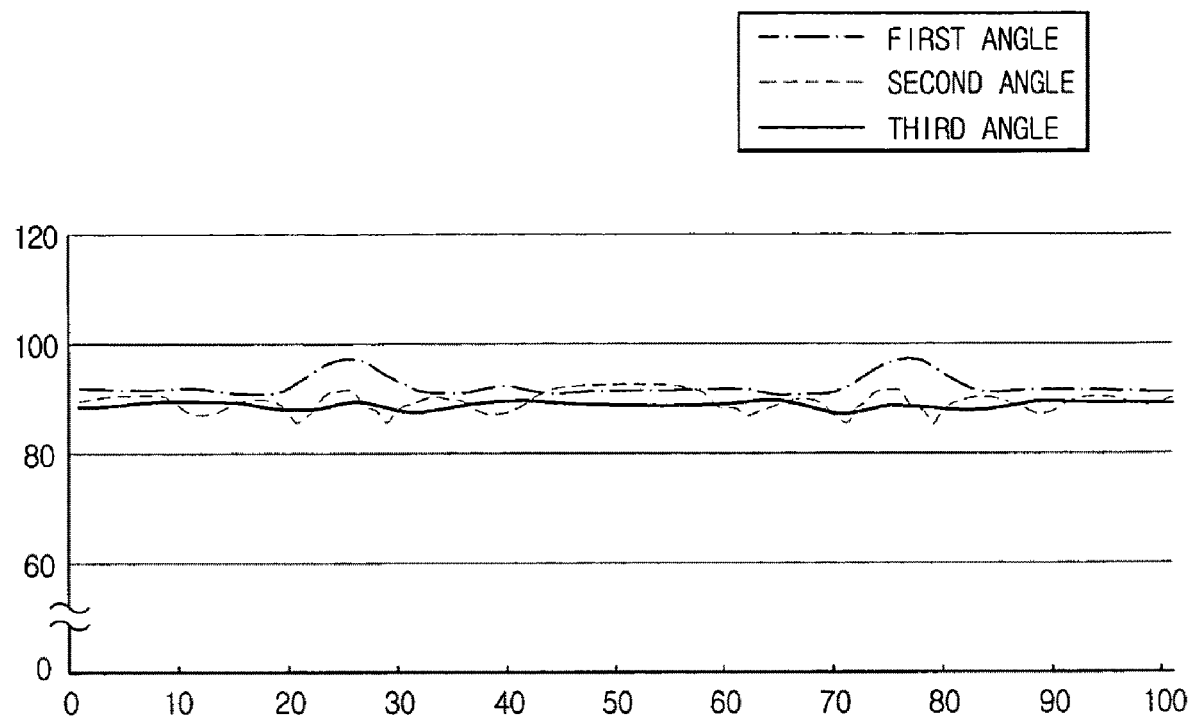
FIG. 5 is a graph illustrating brightness uniformity according to a vertex angle of a first refracting surface shown in FIG. 2.

FIG. 5 is a graph illustrating brightness uniformity according to the vertex angle of the first refracting surface shown in FIG. 2.

The ordinate of the graph represents brightness at a point of the abscissa, and light sources are located at points 25 and 80 of the abscissa.

As shown, it can be experimentally understood that different angles of vertexes, i.e. a first angle (shown by the dash-dotted line), a second angle (shown by the dotted line), and a third angle (shown by the solid line) have different brightness uniformities.

The first angle (shown by the dash-dotted line) represents the case where the vertex angle is 81 degrees. When the vertex angle is 81 degrees, it can be understood from the graph that the points 25 and 80 as locations of the light sources L exhibit brightness close to 100, but other points exhibit a numerical value of about 90. Brightness uniformity calculated based on the experimental value is 93%.

The second angle (shown by the dotted line) represents the case where the vertex angle is 75 degrees. When the vertex angle is 75 degrees, it can be understood from the graph that the points 25 and 80 as locations of the light sources L exhibit a numerical value of about 90, but other points exhibit serous brightness irregularity. Brightness uniformity calculated based on the experimental value is 92%.

The third angle (shown by the solid line) represents the case where the vertex angle is 78 degrees. When the vertex angle is 78 degrees, as shown in the graph, it can be understood that the points 25 and 80 as locations of the light sources L exhibit a numerical value of about 90, and other points stably exhibit a numerical value of about 90. Brightness uniformity calculated based on the experimental value is 98%.

When considering the above experimental values, it can be understood that the vertex angle in a range of 76 to 80 degrees provides remarkably enhanced brightness uniformity as compared to other numerical values, and the brightness uniformity reaches a peak value at the angle of 78 degrees.

Figure 6:
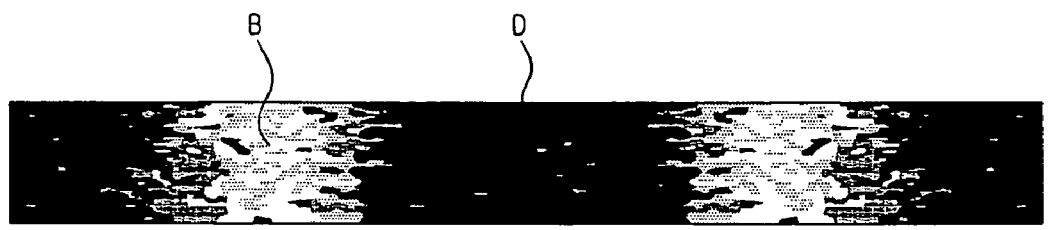
FIGS. 6 and 7 are views illustrating brightness-distribution and ray-tracing results.
Figure 6:
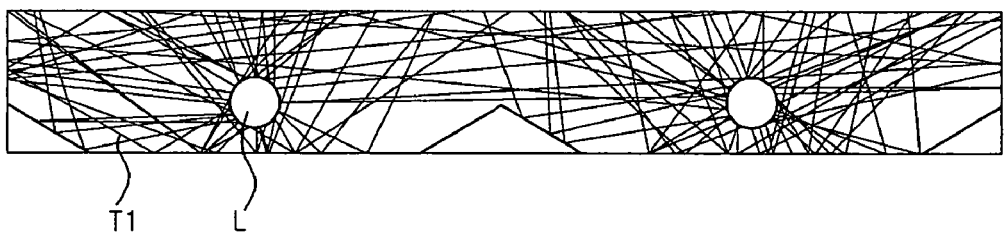
Figure 7:
Figure 7:
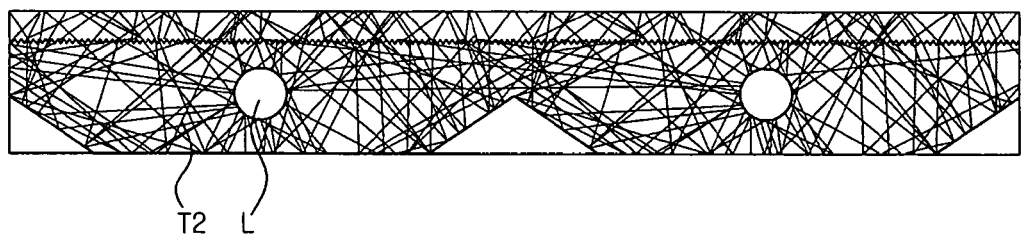

FIGS. 6 and 7 are views illustrating brightness-distribution and ray-tracing results. More specifically, FIG. 6 illustrates the case of not using the refracting plate of the present invention, and FIG. 7 illustrates the case using the refracting plate of the present invention. Meanwhile, FIGS. 6A and 7A illustrate brightness-distribution, and FIGS. 6B and 7B illustrate ray-tracing results.

Brightness-distribution and ray-tracing are methods to visually show rays and destination points of light emitted from a light source using computer simulations. The higher the uniformity of brightness distribution and the higher the complexity of ray-tracing results, the superior the grade of the resulting display device.

As can be understood from paths T1, when no refracting plate is used, light emitted from the light sources L is diverged upward in a relatively monotonous manner. Meanwhile, it can be understood that the paths T1 causes a bright region B above the light source L and a dark region D distant from the light source L, which are clearly distinguished and alternated, resulting in considerably low brightness uniformity throughout a region over the light sources L.

On the other hand, as can be understood from paths T2, when the refracting plate of the present invention is used, light emitted from the light sources L is diffused upward after undergoing complex reflection and refraction courses, resulting in uniform brightness throughout a region above the light sources L.

As described above, constant brightness uniformity enables a reduction in a distance between the light source and the display panel, and in turn, such a reduced distance between the light source and the display panel enables a reduction in a thickness of the display device. When using the refracting plate of the present invention, the display device can be designed to have a thickness equal to one-third that of conventional display devices.

As apparent from the above description, the present invention provides a display device wherein light emitted from a light source is uniformly diffused. As a result, high brightness uniformity can be accomplished even at positions relatively close to the light source, and the display device can achieve a reduction in thickness.

Although a few exemplary embodiments of the present invention have been shown and described, it would be appreciated by those skilled in the art that changes may be made in these exemplary embodiments without departing from the principles and spirit of the present invention, the scope of which is defined in the claims and their equivalents.

What is claimed is:

1. A display device comprising:
   a plurality of light sources spaced apart from one another;
   a refracting plate disposed over the plurality of light sources; and
   first and second refracting surfaces formed at opposite surfaces of the refracting plate to allow light emitted from the light sources to be scattered plural times by passing through the refracting plate, the first and second refracting surfaces having different shapes from each other,
   wherein the second refracting surface defines a sinusoidal waveform formed throughout the second refractive surface of the refracting plate, the second refractive surface having alternately repeated valleys and ridges, and the second refractive surface having dents, which are dented toward the light sources, and which are formed at the ridges.

2. The display device according to claim 1, wherein the first refracting surface defines a triangular waveform formed throughout the first refracting surface of the refracting plate, and vertexes of the triangular waveform are oriented toward the light sources.

3. The display device according to claim 2, wherein the vertexes have a vertex angle, which is in a range of 76 to 80 degrees.

4. The display device according to claim 1, wherein the dents are located over the light sources which are spaced apart from one another.

5. The display device according to claim 3, wherein the first and second refracting surfaces are arranged such that the light emitted from the light sources first passes through the first refracting surface, and thereafter, passes through the second refracting surface.

6. The display device according to claim 1, wherein the refracting plate is provided by extrusion molding of transparent plastic resin.

7. The display device according to claim 1, wherein the light sources are Cold Cathode Fluorescent Lamps (CCFLs) or Light Emitting Diodes (LEDs).

8. A display device comprising:
   a plurality of light sources spaced apart from one another; and
   a refracting plate arranged over the plurality of light sources and having one surface defining a triangular waveform and an opposite surface defining a sinusoidal waveform to allow light emitted from the light sources to be refracted and scattered plural times, the sinusoidal waveform being provided, at positions above the respective light sources, with dents to be dented toward the light sources,
   wherein the opposite surface has alternately repeated valleys and ridges, and the opposite surface has the dents, which are dented toward the light sources, and which are formed at the ridges.

9. A display device comprising:
   a plurality of light sources spaced apart from one another;
   a refracting plate arranged over the plurality of light sources and having refracting surfaces to allow light emitted from the light sources to be refracted and scattered plural times; and
   a display panel to display an image using the light having passed through the refracting plate,
   wherein the refracting surfaces comprise:
   a first refracting surface defining a triangular waveform formed throughout the first refracting surface of the refracting plate; and
   a second refracting surface, which is opposite the first refracting surface, the second refractive surface defining a sinusoidal waveform formed throughout the second refracting surface of the refracting plate and provided with alternately repeated valleys and dents, which are dented toward the light sources.

10. The display device according to claim 9, wherein the dents are repeatedly formed at ridges of the sinusoidal waveform, and are located above the light sources.

11. The display device according to claim 9, wherein the first and second refracting surfaces are provided at the refracting plate such that the light emitted from the light sources first passes through the first refracting surface, and thereafter, passes through the second refracting surface.

12. The display device according to claim 9, further comprising a diffusing plate interposed between the refracting plate and the display panel, to facilitate diffusion of the light having passed through the refracting plate.

13. The display device according to claim 9, further comprising a reflecting plate provided at a rear side of the light sources, to reflect the light emitted from the light sources toward the refracting plate.

14. The display device according to claim 9, wherein the refracting plate is provided by extrusion molding of transparent plastic resin.

15. The display device according to claim 9, wherein the light sources are Cold Cathode Fluorescent Lamps (CCFLs) or Light Emitting Diodes (LEDs).

16. A display device comprising:
   a plurality of light sources spaced apart from one another;
   a refracting plate arranged over the plurality of light sources and having one surface defining a triangular waveform and an opposite surface defining a sinusoidal waveform to allow light emitted from the light sources to be refracted and scattered plural times, the sinusoidal waveform being provided, at positions above the respective light sources, and the refracting plate having dents, which are dented toward the light sources; and
   a display panel to display an image using the light having passed through the refracting plate,
   wherein the opposite surface has alternately repeated valleys and ridges, and the opposite surface has the dents, which are dented toward the light sources, and which are formed at the ridges.

17. The display device according to claim 4, wherein the first and second refracting surfaces are arranged such that the light emitted from the light sources first passes through the first refracting surface, and thereafter, passes through the second refracting surface.

18. The display device according to claim 1, wherein the dents are V-shaped.

19. The display device according to claim 8, wherein the dents are V-shaped.

20. The display device according to claim 9, wherein the dents are V-shaped.

21. The display device according to claim 16, wherein the dents are V-shaped.

* * * * *